(12) United States Patent
Schioppa

(10) Patent No.: US 7,877,840 B2
(45) Date of Patent: Feb. 1, 2011

(54) CONSTRUCTIVE ARRANGEMENT APPLIED TO SWIVEL CASTOR GUARDS

(75) Inventor: Roberto Nicola Schioppa, São Paulo (BR)

(73) Assignee: Metalurgica Schioppa Ltda., São Paulo, SP (BR)

( * ) Notice: Subject to any disclaimer, the term of this patent is extended or adjusted under 35 U.S.C. 154(b) by 477 days.

(21) Appl. No.: 12/002,933

(22) Filed: Dec. 19, 2007

(65) Prior Publication Data

US 2009/0025177 A1 Jan. 29, 2009

(30) Foreign Application Priority Data

Jul. 23, 2007 (BR) .................. 8701519 U

(51) Int. Cl.
  *B60B 33/00* (2006.01)
(52) U.S. Cl. .................. 16/18 CG
(58) Field of Classification Search .............. 16/18 CG, 16/45, 18 R, 18 B, 41; 301/105.1, 108.1, 301/108.3; 248/188.9, 345.1; 5/200.1, 663
See application file for complete search history.

(56) References Cited

U.S. PATENT DOCUMENTS

| | | | | |
|---|---|---|---|---|
| 1,285,142 A | * | 11/1918 | Happensack | 16/18 CG |
| 2,129,579 A | * | 9/1938 | Herold | 16/18 CG |
| 2,483,241 A | * | 9/1949 | Shepherd | 16/18 CG |
| 2,981,969 A | * | 5/1961 | Fontana | 16/18 CG |
| 3,127,632 A | * | 4/1964 | Rice et al. | 16/18 R |
| 3,345,675 A | * | 10/1967 | Haydock | 16/45 |
| 3,858,271 A | * | 1/1975 | Howard et al. | 16/45 |
| 4,077,088 A | * | 3/1978 | Melara | 16/47 |
| 4,262,871 A | * | 4/1981 | Kolk et al. | 248/188.7 |
| 5,163,539 A | * | 11/1992 | Yang | 190/18 A |
| 6,332,240 B1 | * | 12/2001 | Wu | 16/18 CG |

\* cited by examiner

*Primary Examiner*—Chuck Y. Mah
(74) *Attorney, Agent, or Firm*—Collard & Roe, P.C.

(57) ABSTRACT

A constructive arrangement applied to swivel castor guards represented as an improvement that provides the possibility to interchange an infinite variety of end pieces on a single basic castor structure, providing the ability to create a wide range of castor models at a reduced cost, considering that the constructive arrangement disclosed requires a reduced amount of investment in production tooling, limited to the interchangeable end piece, as the new components, namely the main body with a wheel guard having a slot on its trailing end face and the intermediate part, which are part of the improvement, can be considered as standard parts.

4 Claims, 3 Drawing Sheets

CONSTRUCTIVE ARRANGEMENT APPLIED TO SWIVEL CASTOR GUARDS

BACKGROUND OF THE INVENTION

This application describes an innovative solution for devices used to provide mobility to furniture and other products, known as castors, said solution being distinguished from prior art by its innovation in terms of safety, ease of assembly, and interchangeability of parts, more specifically the parts that form the trailing end of the wheel guard, known as end pieces.

The new constructive arrangement disclosed herein is primarily intended to ensure the interchangeability of end pieces of any sort, shape or motif, on a single castor body.

As a consequence of this interchangeability of end pieces, the applicant is able to provide this product with a competitive advantage as of yet unknown to prior art for swiveling or non-swiveling castors.

In addition to the competitive advantage above the applicant also emphasizes that from an industrial perspective this solution provides castors with a greater number of standard parts (obviously within the typical size parameters of products of this nature), positively affecting the industrial cost of customization for different production volumes.

Another aspect to be emphasized, also from an industrial perspective, is the fact that the new constructive arrangement adds value by substantially reducing the costs of tooling for the production of components. For any new castor model to be produced, new injection molds will be required only for the interchangeable end piece, as there will already be injection molds available for the standard main body and intermediate part.

The assembly, comprising a main body with a flat face on the trailing end to accommodate an intermediate part to which the interchangeable end piece is coupled, can be seen as part of an object with a practical purpose, whether in the form o swivel castor or a non-swivel castor. The new constructive arrangement provides functional and industrial improvements and a competitive advantage.

SUMMARY OF THE INVENTION

In order to render veracity to the context of this introduction, the applicant now makes a brief, but consistent explanation of prior art for swivel castors, so that a person skilled in the art will be able to recognize restrictive aspects from an industrial or economic perspective. The advantages provided by the new constructive arrangement, which enables limitless interchangeability of end pieces having all sorts of shapes and motifs, will be described subsequently.

Castors are widely used for applications such as household or office furniture, or for industrial purposes.

In general, castors have a notably simple constructive concept, consisting of an assembly comprising a yoke, an axle, a wheel with bearings, and other components. Brakes are often added to prevent furniture from moving about freely.

The world of business is extremely dynamic. A great number of new products are introduced at a rapid pace, and each product comprises a wide range of models. In this aspect, the castor business is a fertile field for development.

Although swivel castors are primarily intended to provide mobility to products or furniture, they deficient in terms of the availability of a wide range of models and shapes.

The castors known to prior art cannot be visually altered; that is, their finish components cannot be interchanged. This restriction limits the success of this product in some areas of the current market, in which there is a demand for creative solutions and products that are variable in shape and form.

A critical analysis of this inertia in the development of castors will show that castors are designed solely for the purpose of providing mobility to equipment/products.

For castors to satisfy the demand for variability, especially visual variability, different designs and therefore different tooling would be required to produce the different shapes of the castor body (wheel guard).

Hence, in order to satisfy the demand for new castor models, there would be the negative aspect of greater industrial costs and more time required to produce new products, which conflicts with the urgency of immediate sales campaigns.

In light of the prior art, the applicant has developed an improvement to the guards of swivel castors applied to furniture (or any other products), providing a series of advantages when compared to the castors described in the prior art section above.

In general terms:

The improved swivel castor has a constructive arrangement whose visual appearance is infinitely variable;

The improved swivel castor is visually defined as having a main body, also known as a guard, which has a flat face on the trailing end to accommodate an intermediate part specially designed to accommodate a third, press-fitted component, referred to herein as the interchangeable end piece;

The improved swivel castor for furniture (or any other products) is characterized by ease of assembly during the manufacturing process; and The interchangeable end piece can have all sorts of geometrical shapes and forms.

BRIEF DESCRIPTION OF THE DRAWINGS

For better comprehension of the characteristics of the subject matter of this utility model patent application, a set of drawings are provided which illustrate a non-restrictive example of an embodiment of this constructive arrangement applied to castors, where.

DETAILED DESCRIPTION OF THE PREFERRED EMBODIMENT

Figure 1:
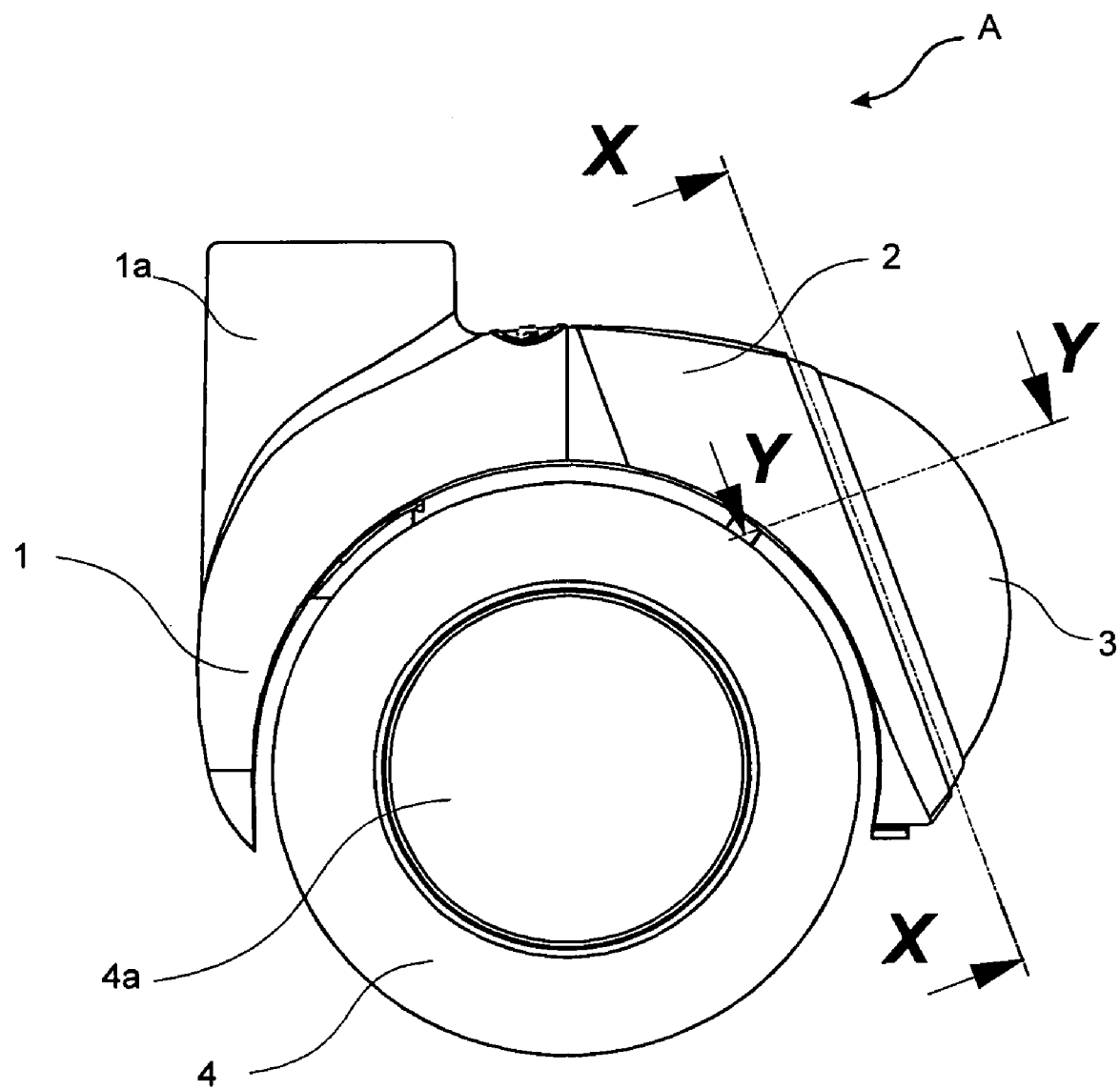
FIG. 1 is a side view of the improved castor.

The following description should be read and interpreted with reference to the drawings, which are highly diagrammatic and represent an exemplary embodiment of the new constructive arrangement applied to castors; the drawings are not intended to limit the scope of the invention, which is limited only by the claims.

With reference to the illustrated drawings, this invention patent application relates to a "swivel castor" A having a structural body 1 with a wheel guard of any geometric shape or form, manufactured of different materials, such as 6.0 nylon reinforced by fiberglass, said structural body 1 having a vertical housing 1b on the upper side of the leading end designed to accommodate the stem (not shown) used to secure the swivel castor A to the product. In addition, this structural body 1 incorporates a transverse axle (not shown) to the ends of which a pair of wheels 4 with hub caps 4a is installed.

On this point, the applicant emphasizes that there are innumerable design possibilities for the swivel castor A. For example, the assembly disclosed herein can be applied to castor product families where the stem (not shown) coupled to the vertical housing 1*b* can be defined for any of the three main types of fittings used for furniture, namely plate fittings, threaded stems or friction stems.

On the trailing end of the wheel guard 1*a* there is slot 1*c*, and in this slot here is a guide element 1*d* in the form of a linear protrusion designed for coupling the intermediate part 2.

The intermediate part 2 has a base body 2*a* whose peripheral outline matches that of the slot 1*c* on the wheel guard 1*a*. On the trailing end of the intermediate part, or more specifically on the rear surface 2*a*' of the intermediate part there is a plurality of female coupling elements 2*b* to accommodate a plurality of male coupling elements 3*b*, such as pins, on the interchangeable end piece 3.

Also as part of the scope of the constructive concept of the intermediate part, 2, the base body 2*a* has a pair of coupling tracks 2*c* on its leading end, arranged parallel to one another and aligned so that they can be slip-fitted to the guide element 1*d* in the trailing end slot 1*c* of the wheel guard 1*a* on the main body 1.

Finally, on the lower side of this pair of coupling tracks 2*c* there is a latch 2*d* that enables the intermediate part 2 to be permanently fastened to the main body 1.

Figure 2:
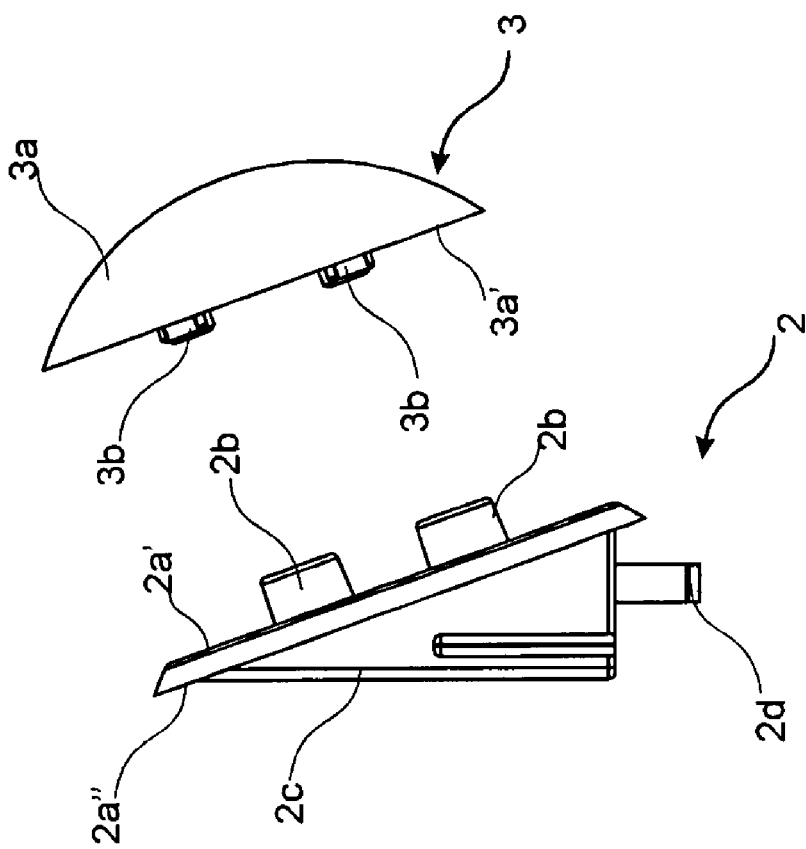
FIG. 2 is an exploded side view of the improved castor.
Figure 2:
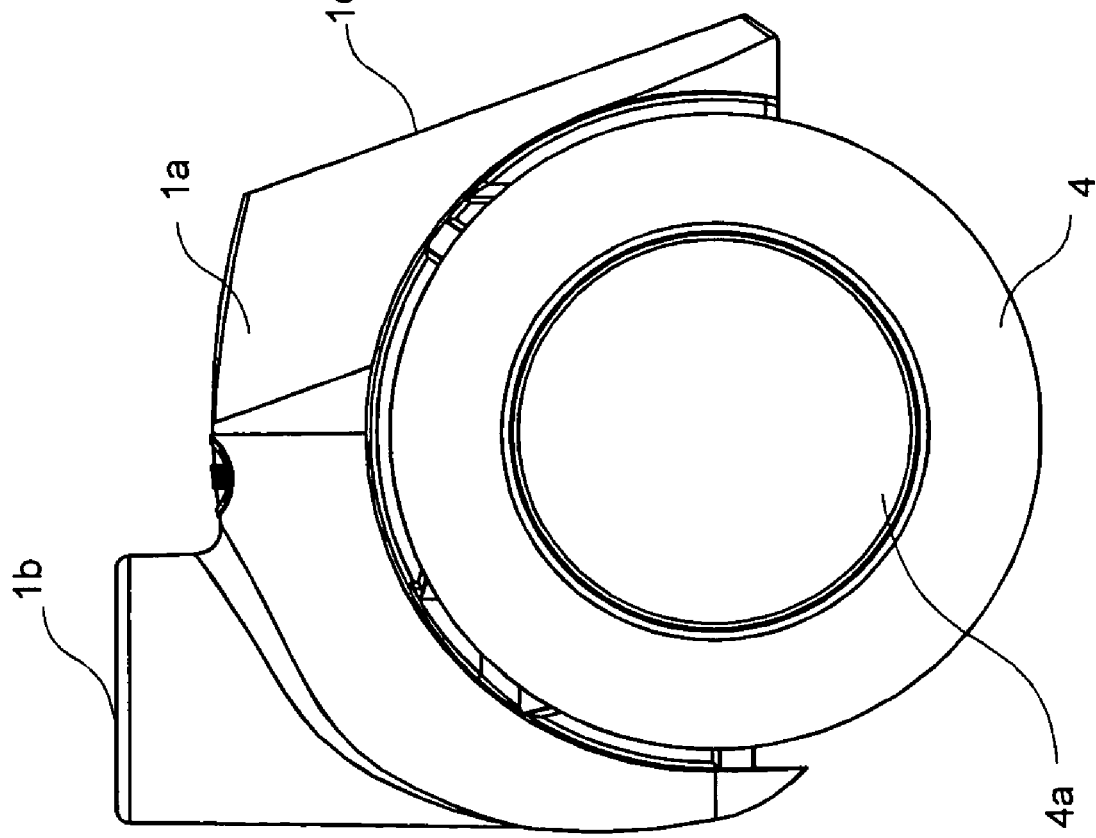
Figure 3:
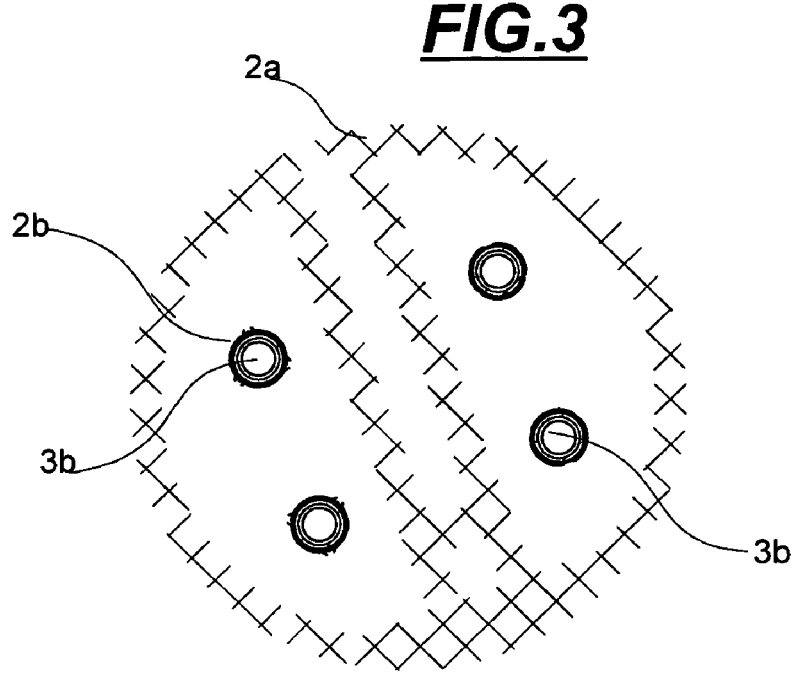
FIG. 3 is an "XX" section of the intermediate part of the improved castor.
Figure 4:
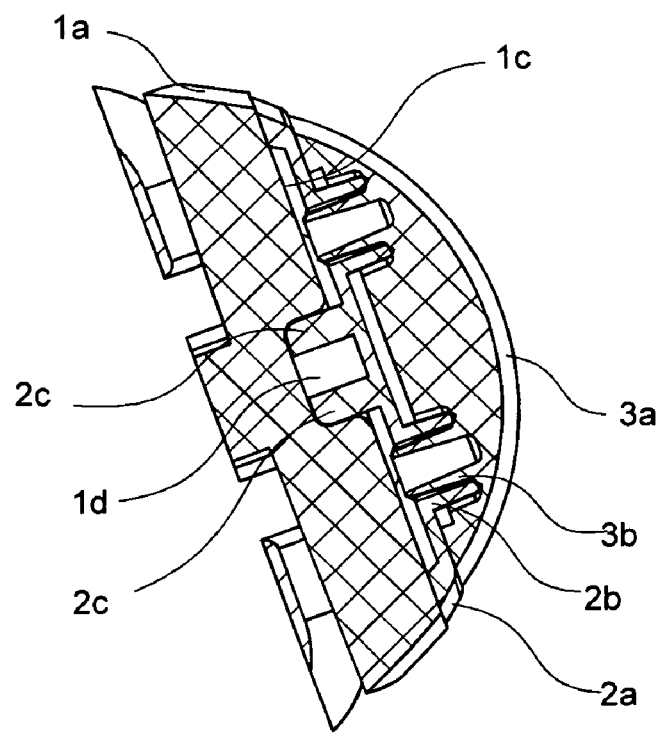
FIG. 4 is an "YY" section of the intermediate part of the improved castor.

The interchangeable end piece 3 is defined as a main body 3*a*, as illustrated in FIGS. 2, 3 and 4, which can have an infinite variety of shapes and forms. The leading end side 3*a*' of the interchangeable end piece has a flat face whose peripheral outline matches that of the trailing end surface 2*a*' of the intermediate part 2.

On the leading end face 3*a*' of the interchangeable end piece there is a plurality of male coupling elements 3*b* designed to be ergonomically press fitted to/released from the intermediate part 2 on the main body 1.

The embodiment above described is provided merely as an example. Changes, modifications and variations can be made for any other specific embodiments created by those skilled in the art, without deviating from the intentioned disclosed herein, which is defined solely by the appended claims.

What is claimed is:

1. A swivel castor comprising:
   a structural body having a wheel guard with a trailing end face, the trailing end face having a slot with a guide element formed by a linear protrusion;
   an upper vertical housing connected to the structural body for accommodating a stem for securing the castor to furniture;
   an intermediate part coupled to the wheel guard, said intermediate part having a base body with a leading end surface and a trailing end surface, a pair of coupling tracks arranged perpendicularly to the leading end surface and being coupled to the guide element on the wheel guard, a latch on a lower end of said base body, and a plurality of female coupling elements disposed on a trailing end surface of said base body;
   an interchangeable end piece having a plurality of male coupling elements that are connected the female coupling elements on the base body; and
   an axle connected to the structural body to support a pair of wheels.

2. The swivel castor according to claim 1, wherein the plurality of female elements is formed by four columns, each column being defined by a discrete cylindrical protrusion arranged perpendicularly to the trailing end surface of the base body.

3. The swivel castor according to claim 1, wherein the plurality of male coupling elements is formed by four pins arranged perpendicularly to a leading end surface of the interchangeable end piece.

4. The swivel castor according to claim 1, wherein peripheral outlines of the slot of the structural body, the base body of the intermediate part and a leading end face of the interchangeable end piece are identical.

\* \* \* \* \*